(12) United States Patent
Rixen (10) Patent No.: US 11,938,788 B2
(45) Date of Patent: Mar. 26, 2024

(54) FLUID HEATING SYSTEM

(71) Applicant: James M Rixen, Sandy, OR (US)

(72) Inventor: James M Rixen, Sandy, OR (US)

( * ) Notice: Subject to any disclaimer, the term of this patent is extended or adjusted under 35 U.S.C. 154(b) by 780 days.

(21) Appl. No.: 17/032,846

(22) Filed: Sep. 25, 2020

(65) Prior Publication Data

US 2022/0097484 A1 Mar. 31, 2022

(51) Int. Cl.
| | |
|---|---|
| B60H 1/22 | (2006.01) |
| B60H 1/00 | (2006.01) |
| F23N 1/02 | (2006.01) |
| F24D 12/02 | (2006.01) |
| F24D 19/10 | (2006.01) |
| F24H 1/00 | (2022.01) |

(52) U.S. Cl.
CPC .......... B60H 1/22 (2013.01); B60H 1/00342 (2013.01); F23N 1/025 (2013.01); F24D 12/02 (2013.01); F24D 19/1066 (2013.01); F24H 1/009 (2013.01); B60H 2001/2228 (2013.01); F23N 2225/04 (2020.01); F23N 2225/18 (2020.01); F23N 2233/08 (2020.01)

(58) Field of Classification Search
None
See application file for complete search history.

(56) References Cited

U.S. PATENT DOCUMENTS

| | | | | |
|---|---|---|---|---|
| 5,553,662 A * | 9/1996 | Longardner | .......... | F24F 5/0021 165/902 |
| 6,347,748 B1 * | 2/2002 | Lyons | .................. | F24D 3/1066 237/69 |
| 11,454,548 B2 * | 9/2022 | Henderson | ............... | G01K 7/02 |
| 2001/0041063 A1 * | 11/2001 | Rixen | ...................... | B60N 3/18 392/496 |
| 2003/0062423 A1 * | 4/2003 | Rixen | ................ | B60H 1/00364 237/19 |
| 2003/0230633 A1 * | 12/2003 | Rixen | ................ | B60H 1/00364 165/96 |
| 2003/0234296 A1 * | 12/2003 | Rixen | ...................... | F23N 3/08 237/69 |
| 2007/0034702 A1 * | 2/2007 | Rixen | .................. | B60H 1/2206 237/2 A |
| 2011/0240623 A1 * | 10/2011 | McGaugh | .............. | H05B 1/028 219/202 |
| 2012/0091214 A1 * | 4/2012 | Rixen | ................. | F24D 19/1066 237/5 |

(Continued)

*Primary Examiner* — Avinash A Savani
*Assistant Examiner* — Deepak A Deean
(74) *Attorney, Agent, or Firm* — Mark S Hubert (57) ABSTRACT

A fluid heating system intended for use in recreational vehicles that circulates glycol in a system loop with various heat sources and other devices that distribute this heat to an enclosure or a domestic water system. It has a system controller operationally connected to a remove tactile display unit that allows for the input of the operation parameters to the system controller. The control unit is operatively connected for data and signal transfer to the user's cell phone via a non-internet connected localized wi-fi network. This provides the user with system status information, fault codes and allows selected operational functions and resets to be remotely initiated that heretofore required local manipulation. It also incorporates altimeter to allow the furnace controller to maximize its burn efficiency.

9 Claims, 6 Drawing Sheets

(56) References Cited

U.S. PATENT DOCUMENTS

| | | | |
|---|---|---|---|
| 2012/0247716 A1* | 10/2012 | Galtz | B60L 50/16 |
| | | | 165/41 |
| 2013/0180972 A1* | 7/2013 | McGaugh | B60L 1/02 |
| | | | 219/202 |
| 2018/0231260 A1* | 8/2018 | Wilson | F24D 19/1096 |
| 2021/0041153 A1* | 2/2021 | McQuade | F24F 11/36 |
| 2022/0118822 A1* | 4/2022 | Gutowski | B60H 1/00021 |

* cited by examiner

FLUID HEATING SYSTEM

FIELD

The present disclosure relates, in general, to the design of a fluid based heating system for domestic hot water heating or space heating as would typically be found in recreational vehicles including class A B or C motorhomes, fifth wheels and trailers as well as marine applications and off the electrical grid housing. More particularly, to the microprocessor units that control all of the various system components involved in this technology.

BACKGROUND

Providing heating for domestic water and enclosed spaces in mobile or remote enclosures whether it be an RV, a boat or a permanent structure involves a plethora of different heating options. Generally, they will have redundancy in both the heat sources and the heat dispensing units. While the main heating system will have a common heating loop (hydronic or glycol based) the various heating sources will be individual, stand-alone systems. The coordination of the amalgamation of all of the operational controls of these various heating systems into one overarching control system as well as the dispensing of the heat generated thereby is a complex endeavor. The average person will not understand all of the operational aspects of the various systems, so operational safeguards will have to be integrated with respect to accidentally turning off system battery power, not allowing for sufficient furnace run down or cooling off time, operating below fuel cut off levels, exceeding system start attempts, operating in high altitude locations, and overshooting system high temperature limits. To complicate matters, people cannot see the system status, see the fault codes, reset minor operational issues or initiate a specific mode of operation for the system unless they are physically present.

Henceforth, a fluid heating system that integrates the control of various components to operate in different modes and allow the user the ability to monitor, troubleshoot, operate and overcome common operational problems would fulfill a long felt need in the industry. This new invention utilizes and combines known and new technologies in a unique and novel configuration to overcome the aforementioned problems and accomplish this.

BRIEF SUMMARY

In accordance with various embodiments, a fluid heating system (hydronic or other circulating heat transfer fluid) with an integrated control system that allows for remote operation, troubleshooting and repair, is provided.

In one aspect, a fluid heating system with a remote tactile panel operatively connected to a central microprocessor controller unit having a wireless data transmission unit that broadcasts the system status and fault codes as well as allowing for resetting certain operational lockouts from a cell phone, is provided.

In another aspect, a microprocessor controller unit that can switch the battery power source for a timed interval from the engine battery bank to the system battery bank to facilitate continued operation of specific heating system modes such as proper furnace shutdown, is provided.

In yet another aspect, a microprocessor control unit that safeguards the gas furnace from damage due to excessive heat buildup during improper shutdown, is provided.

In yet another aspect, a microprocessor control unit that has a 12 to 24 step up transformer to run larger furnaces (converter), is provided.

In a further aspect a microprocessor controller unit for a fluid heating system that incorporates an altimeter for the automated control of the gas furnace's fuel and air ratio mixtures at higher elevations over 5,000 feet, is provided.

In yet a final aspect, a microprocessor controller unit with a stand-alone wireless data transmission capability for communication with a user's smart cell phone.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. Well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first switch could be termed a second switch, and, similarly, a second switch could be termed a first switch, without departing from the scope of the inventive concept.

It will be understood that when elements are referred to as being "operationally connected" it refers to the fact that the two elements are in electronic, electric, optical or wireless communication (via a hard wire or wireless protocol) such that the tactile manipulation or automated actions of one or both of the elements is capable of sending a signal (data, electric, electronic, optical or wireless) to the other element so as to affect the operation of the other element. Similarly, it refers to the ability to transfer data between elements that may be acted upon or may be manipulated into a readable output format for visual representation. Like numbers refer to like elements throughout.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated steps, operations, elements, and/or components, but do not preclude the presence or addition of one or more other steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. Specifically, the order of the various elements in the system flow loop may be switched. In the way of an example, the gas furnace may be upstream of the electric furnace or it may be downstream of the electric furnace. Where in the system flow loop the various subsystems are located, may vary with different manufacturers. By the same token, however, no single feature or features of any described embodiment should be considered essential to every embodiment of the invention, as other embodiments of the invention may omit such features, such as the heated floors.

Unless otherwise indicated, all numbers herein used to express quantities, dimensions, and so forth, should be understood as being modified in all instances by the term "about." In this application, the use of the singular includes the plural unless specifically stated otherwise. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein the term "CAN Bus" refers to a Controller Area Network vehicle bus standard, designed to allow microcontrollers and devices to communicate with each other's applications without a host computer. Here, the fluid heating system has multiple electronic control units (ECU) for the various heating subsystems. The biggest controller is the system controller/remote tactile unit combination. Others are used for the furnace, fans and electric heater. Some of these form independent subsystems, but communications among others are essential. A subsystem may need to control actuators or receive feedback from sensors. The CAN standard was devised to fill this need. One key advantage is that interconnection between different vehicle systems can allow a wide range of safety and operational features to be implemented using software alone—functionality which would add cost and complexity if such features were "hard wired" using traditional automotive electrics.

As used herein, the term "heat transfer fluid" refers to a liquid flowing in the heat transfer closed loop that has the ability to accept heat from and release heat to the various components connected to the closed heat transfer loop. Generally, this will be an inexpensive fluid with a high thermal conductivity, a high coefficient of heat transfer and a high boiling point. Commonly used heat transfer fluids are ethylene glycol (diol), water or any of a group of alcohols containing two hydroxyl groups.

As used herein, the term "closed system heat transfer fluid flow loop" refers to a system of connected piping, tubing or conduit and the associated components connected thereto that the heat transfer fluid is circulated through. The system is not open to the environment and the heat transfer fluid is circulated around in the loop.

As used herein, the term "vehicle" or "vehicular" refers to any means in or by which someone travels or something is carried or conveyed including but not limited to: boats, ships, marine vessels, cars, trucks, vans, recreational vehicles, travel trailers, motor coaches, fifth wheels and all classes of recreational vehicles.

As used herein, the term "piping" refers to any closed wall conduit capable of conveying a fluid including but not limited to pipes, tubes, ducts, lines and troughs.

As used herein, the term "wireless communication device" is an electronic device that can provide various wireless short range or long-range data and signal transfer between devices. This transfer will be accomplished with protocols, including but not limited to radio frequency (RF), satellite, microwave, Institute of Electrical and Electronics Engineers (IEEE) 545.11, Bluetooth®, optical, infrared, cable, laser, etc.

As used herein the terms "microprocessor and processor" refer to an integrated circuit composed of numerous transistors that have been configured as numerous individual digital circuits, each of which performs some specific logic function that allows it to provide power, data or signals to an external relay, switch or electrical device. These individual circuits also receive, manipulate and export data to and from external devices, as dictated by a central processing unit (CPU) in the microprocessor/processor.

As used herein, the term "gas" refers to any liquid or gaseous form of hydrocarbon used as a combustible fuel for the generation of heat in the furnace.

As used herein, the term "in-line" means that a component (heat source or heat dispensing unit) has either all or a portion of the heat transfer fluid in the piping loop passing through it as the heat transfer fluid continually circulates through the fluid heating system.

The present invention is a fluid heating system intended for use in recreational vehicles although it is fully applicable to boats and off the grid enclosures. It circulates a heat transfer fluid, preferably glycol, in a system loop with any number of either a gas furnace, electric heater or engine coolant heat exchanger inputting heat to the heat transfer fluid and transferring this heat to a domestic hot water system, a floor heat system or an enclosure fan heater. It has a system controller operationally connected to a remove tactile display unit that allows for the input of operation parameters to the system controller. The control unit is operatively connected for data and signal transfer to the user's cell phone via a non-internet connected localized wi-fi network. This provides the user with system status information, fault codes and allows selected operational functions to be remotely initiated.

Figure 1:
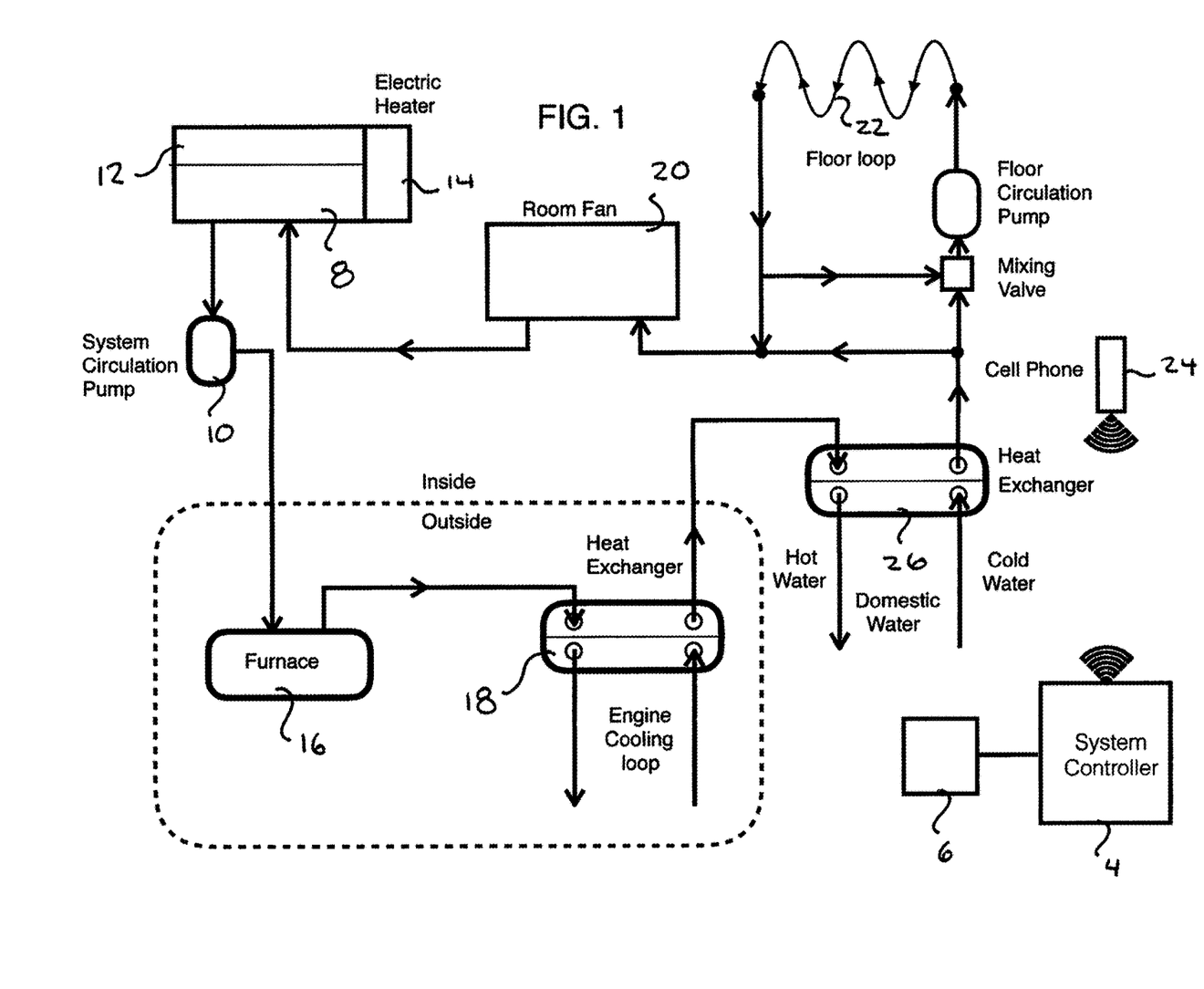
FIG. 1 is a process flow diagram of the fluid heating system.

Looking at FIG. 1 all components of the operational fluid heating system can be seen in the particular architecture or organization of the preferred embodiment. It is known that the sequence of the various components as well as the number of different heat sources and heat distribution units in the fluid loop may vary or be reordered for different environments. The illustrated system of FIG. 1 is configured for a motorhome and considers the physical constraints of a typical motor coach. Some of the components are situated outside of the interior cavity while the majority of the components are inside.

The system is made of a closed heat transfer fluid flow loop 2 ("loop") with a system controller 4 and its operationally connected remote tactile display unit 6. The fluid transfer media 8, preferably glycol, is circulated through all of the system components by a system circulating pump 10 that draws its intake from the bottom of the expansion tank 12. This expansion tank 12 (glycol reservoir) contains a reserve capacity for the expansion, contraction and minor leak compensation of the glycol 8. In the loop 2 is as least one heat source and at least one heat dispensing unit. In the preferred embodiment there are three different heat sources, an electric heater 14 located in the expansion tank 12, a gas/diesel furnace 16 (outside of the cabin of the motorhome) and an engine heat exchanger 18 (outside of the motorhome). There are three heat dispensing units, a domestic water heater 26, a radiator fan room heater 20 and an optional floor heating loop 22. The furnace 16, electric heater 14, room fans 20 and floor heating loop 22 each have their own integrated microprocessor controllers. The system controller 4 initiates the various operating functions of these other device controllers by instructions given by tactile input from the tactile display unit 6 or the user's cell phone 24.

The glycol 8 is pumped through the circulating pump 10 from the bottom of the expansion tank 12 through the furnace 16 then through the engine heat exchanger 18. Heat may be input to the circulating glycol from any of these three heat sources depending on which one is selected for operation at the remote tactile display unit 6. The circulating heated glycol 8 will present its heat energy to a heat exchanger in the domestic water heater system 26 then sequentially to the optional floor heating loop 22 and the room fan 20. From the room fan 20 the glycol is pumped into the expansion tank 12 and the cycle repeats itself. The operation of the different heat sources and heat dispensing units will be discussed separately and in detail herein. Thereafter, the overarching system operation will be discussed.

Figure 2:
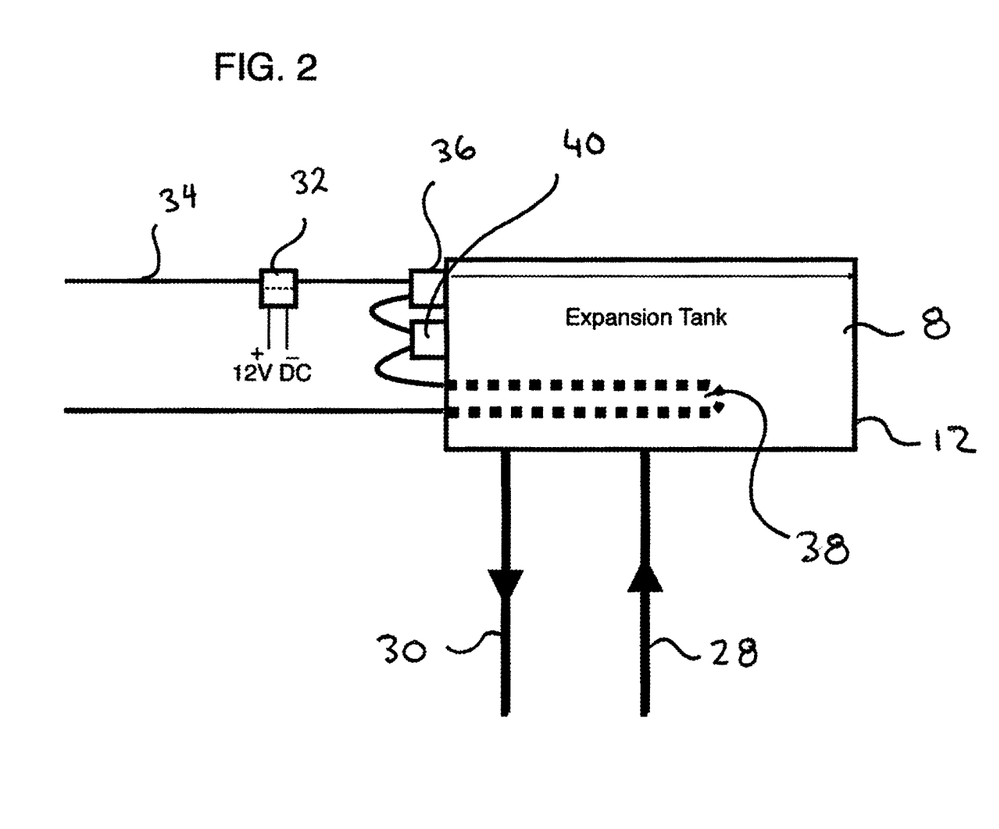
FIG. 2 is a block diagrammatic representation of the electric heater unit.
Figure 6:
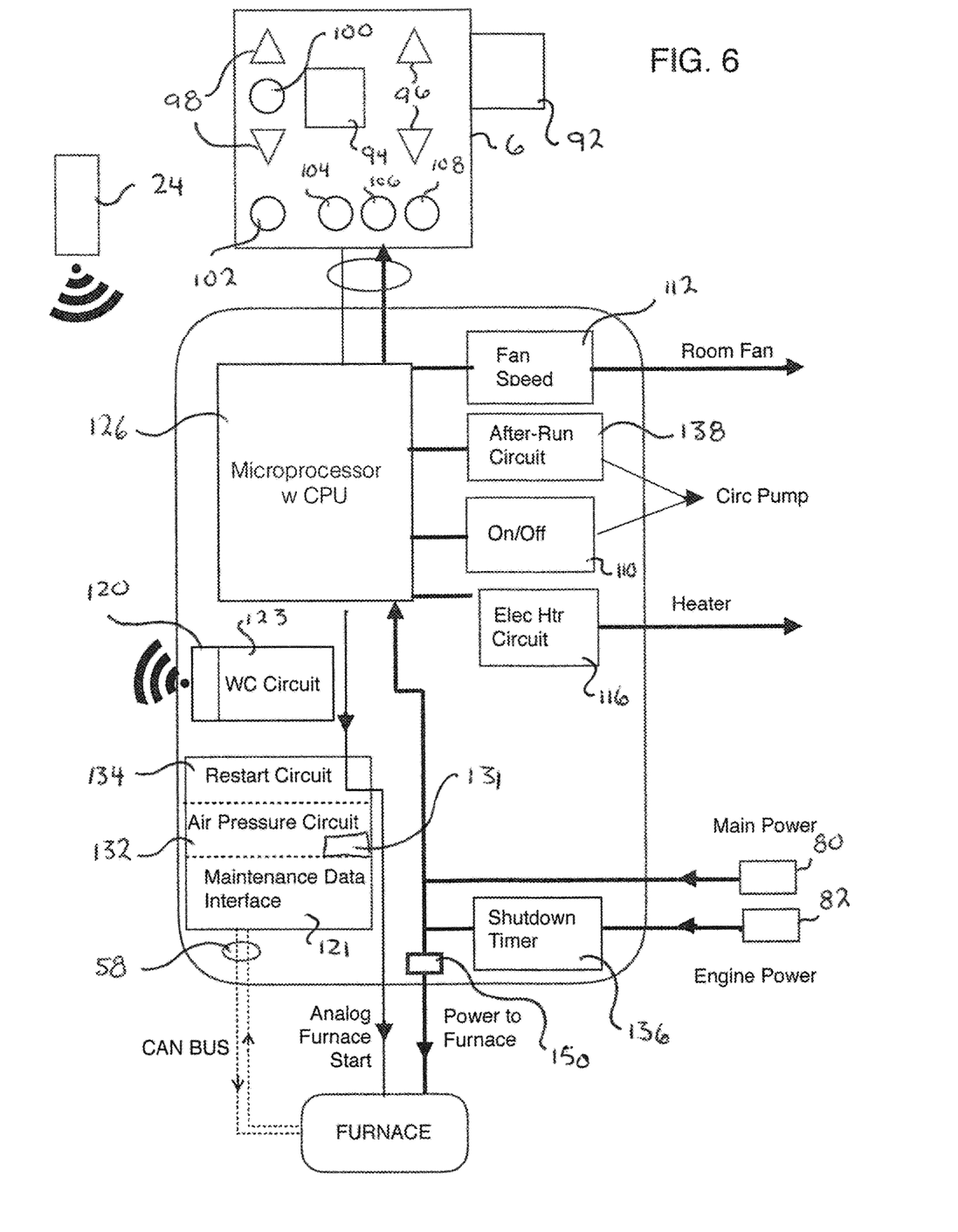
FIG. 6 is a block diagrammatic representation of the system controller unit and its remote tactile display unit.

The Electric Heater 14 is best seen in FIG. 2. The expansion tank 12 has a glycol input line 28, a glycol discharge line 30 and an AC electric heater element 38 located therein. The AC power provided to the heater element 38 is enabled by a 12 volt DC operated heater start switch 32 (electromechanical relay or a solid state module) that closes when the electric heat mode is selected at the tactile display unit 6 and heat is demanded as determined by the temperature sensor 92 in the tactile display unit 6 (FIG. 6). The AC power 34 then passes through a high temperature thermostatic switch 36 that will not allow the AC power to reach the heater element 38 unless the glycol temperature is below a preset high temperature cutout. If the glycol 8 is below the high temperature cutout, the electric power 34 will be provided to the cycling thermostatic switch 40 which monitors the glycol temperature and modulates the AC power on and off to keep the glycol within a specified temperature range, set in the cycling thermostatic switch 40. The temperature sensors for both of these thermostatic switches 36 and 40, may be located in the expansion tank 12 or the outlet glycol line 30 form the expansion tank 12.

Figure 3:
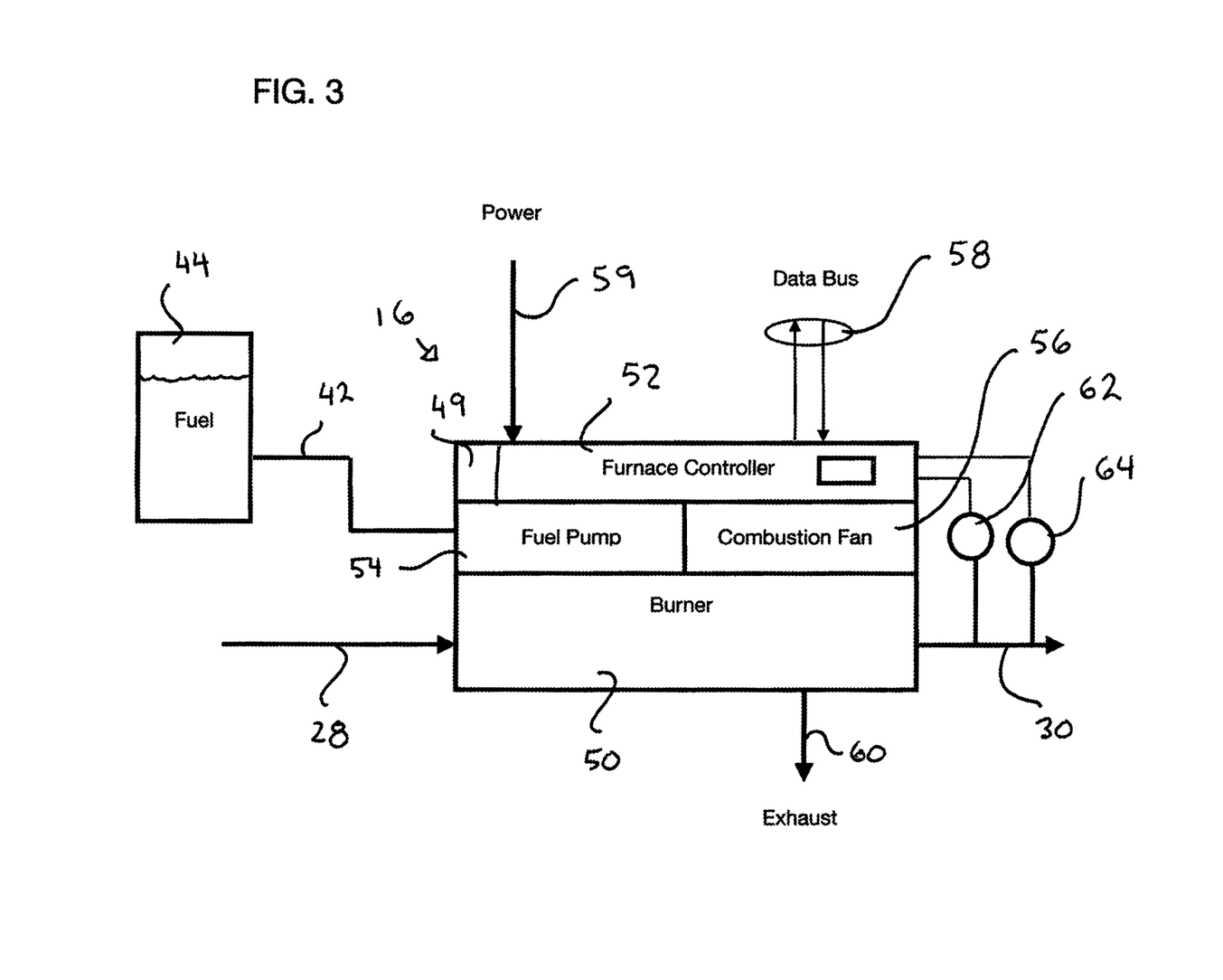
FIG. 3 is a block diagrammatic representation of the gas furnace unit.

The Furnace 16 can be seen in diagrammatic form in FIG. 3. It is made of a furnace microprocessor controller 52 that provides power to the variable speed fuel pump 54, variable speed combustion fan 56 and the burner 50. The furnace controller 52 gets DC power via a hard wire connection wire 59 from the system controller 4. It is also is hard connected to the system controller 4 through a CANBUS wire harness 58 (data bus) for the transfer of operational data and signals between the maintenance data interface circuit 121 (FIG. 6) and the furnace controller 52. The furnace controller 52 is operatively connected to a series of sensors in and around the furnace unit 16 that monitor the following parameters and generate the operational data:

If a start signal has been applied to the heater; the runtime; the combustion fan speed; the glow plug energy; the fuel pump frequency; inlet glycol temperature; outlet glycol temperature; temperature of the flame sensor; voltage at the furnace; air pressure from the altimeter (air pressure circuit) and status of the restart function are all provided as data signals to the microprocessor through the furnace controller and the CANBUS circuit. This data is relayed to the user's smart phone (or other equivalent smart device).

Additionally, the furnace controller 52 analyses the data it receives from its sensors and determines if there is a problem in any of its components. It generates 74 different fault codes that correspond to what it has analyzed as wrong. These are also communicated to the maintenance data interface circuit 121 through a CANBUS harness 58 for transfer to the user's smart phone via the wireless transceiver 120. (FIG. 6) The signals and data from these sensors are relayed to the maintenance data interface circuit 121 (FIG. 6) in the system controller 4 through a CANBUS wire harness 58. The application loaded in the user's cell phone receives this data, interprets it and converts it to a format for visual presentation.

The furnace has a glycol input line 28 and a glycol discharge line 30 that presents the glycol 8 around the burner 50. The burner 50 has an exhaust line 60 that vents its hot gases outside.

There is a temperature sensor 62 and a high temperature sensor 64 in the glycol discharge line 30 that provides temperature data to the furnace controller 52. This temperature data is used to adjust the amount of fuel and air sent to the burner 50 by altering the fuel pump speed and the combustion fan speed. The outside air pressure as determined by the air pressure sensor (altimeter) 131 in the air pressure circuit 132 (FIG. 6) in the system controller 4, also sends signals to the furnace controller 52 to adjust the fuel pump speed and the combustion fan speed to compensate for the lack of oxygen at higher altitudes above 5,000 ft.

The furnace 16 may run off of gas, diesel or optionally, propane. This is dictated by the type of engine that is in the vehicle, because the furnace 16 does not have its own fuel supply, rather it has a fuel line 42 that provides fuel from the vehicle's fuel tank 44 to the fuel pump 54. This fuel line 42 does not draw from the bottom of the fuel tank 44, rather it comes off at the approximate ¼ level of the fuel tank 44 so that continued operation of the furnace will not deplete all the fuel from the tank, leaving nothing to start the vehicle.

When the fuel level drops below ¼ full, the fuel line 42 will entrain air pockets making the furnace 16 hard to start or cause it to flame out when the stream of fuel is interrupted. The flame sensor will send a signal to the furnace ECU This will cause the furnace controller 46 to automatically attempt to reignite. Ignition attempts are communicated from the furnace controller 52 to the system controller 4. If these attempts are made when the fuel tank is near or below the ¼ mark they will continue until the system controller 4 sees there has been an excessive number of ignite attempts and locks out further operation by the disabling the fuel pump start circuit 49 in the furnace controller 58 until it can be reset (normally 5 failed attempts will cause this). In the prior art systems this was a safety precaution that required a technical to or a skilled person to be present at the furnace controller to reset the fuel pump start circuit 49. If the operator was not present, the vehicle would not heat up or be able to maintain its temperature.

The furnace controller 52 sends the furnace system data inputs it has from its sensors to the main system controller 4 via the CANBUS connection. This data is then provided to the user's cell phone via the wireless communication unit of the system controller.

Figure 4:
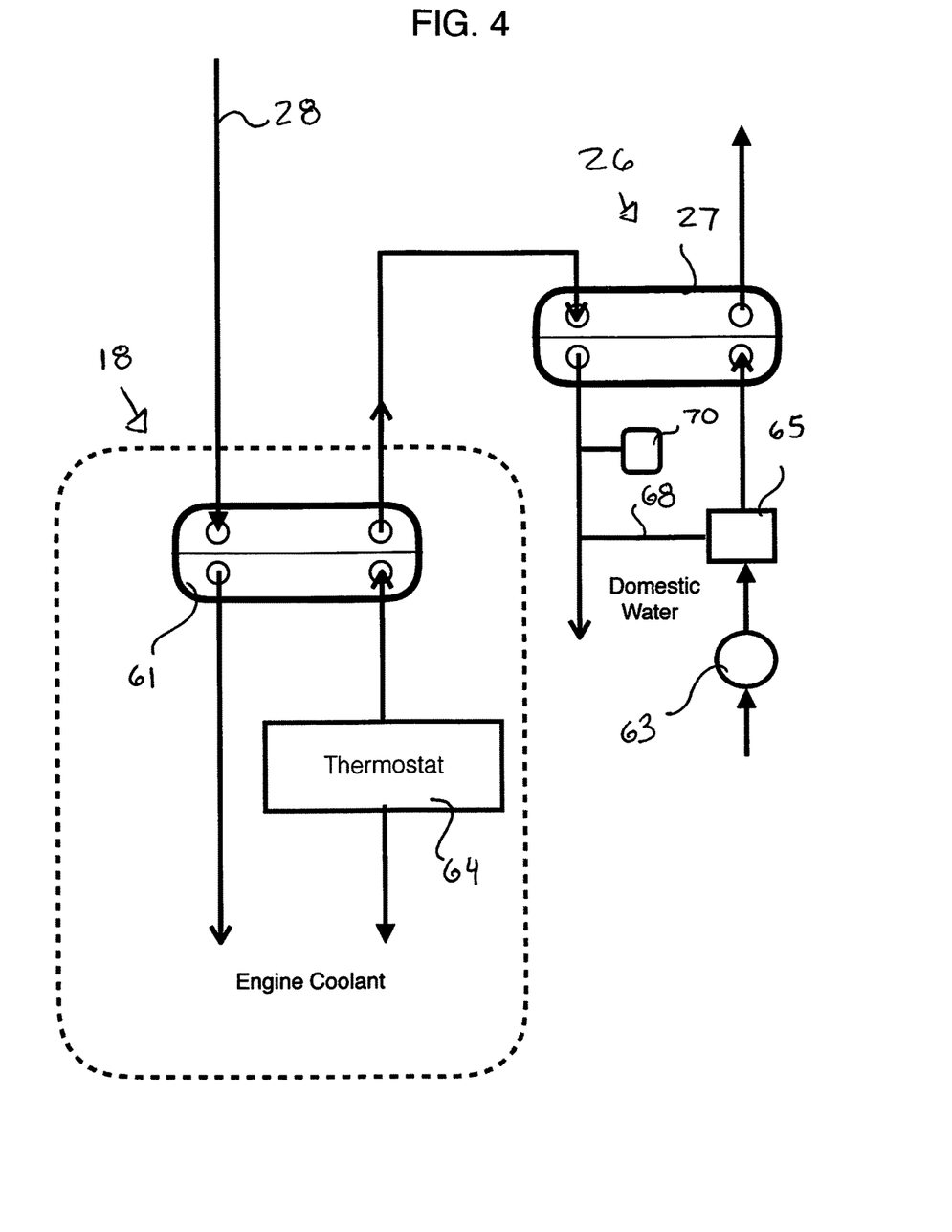
FIG. 4 is a block diagrammatic representation of the engine heater unit and the domestic hot water unit.

The engine heater unit 18 and the domestic (hot) water unit are illustrated together in FIG. 4 although one is a heat source and the other is a heat dispensing unit. Here it can be seen that the glycol 8 enters the engine heater unit 18 from glycol input line 28, gaining heat rejected from the running engine of the vehicle. This is a simple single pass, single wall, counter-current flow-through heat exchanger system, with the only temperature control accomplished by the thermostat 64 on the vehicle coolant side of the heat exchanger. There is no temperature or flow control dictated by the system controller 4. Here, the loop 2 just accepts excess heat that the engine has to shed therein raising the glycol temperature in the system loop 2. Since the typical vehicle engine has its thermostat set for a range of 180-200 degrees F., and with the efficiencies of a single pass counter-current flow heat exchanger, the output temperature of the glycol 8 in the loop with the engine heat exchanger 61 as the only heat source, will reach approximately 120 degrees F.

The output of the engine heater unit 18 is the direct input to the domestic water unit 26. This again is a simple heat exchanger system, however here the counter-current flow and heat transfer is between the glycol of the loop 2 and the cold water of the domestic water system. There is a manual mixing valve 65 that regulates the domestic hot water temperature by adjusting the amount of cold water that enters the heat exchanger 27 and the amount that bypasses the heat exchanger 27 through bypass line 68. A circulating pump 63 moves and pressurizes the domestic water through its own domestic water loop based on a pressure sensor 70 in the domestic water loop.

Figure 5:
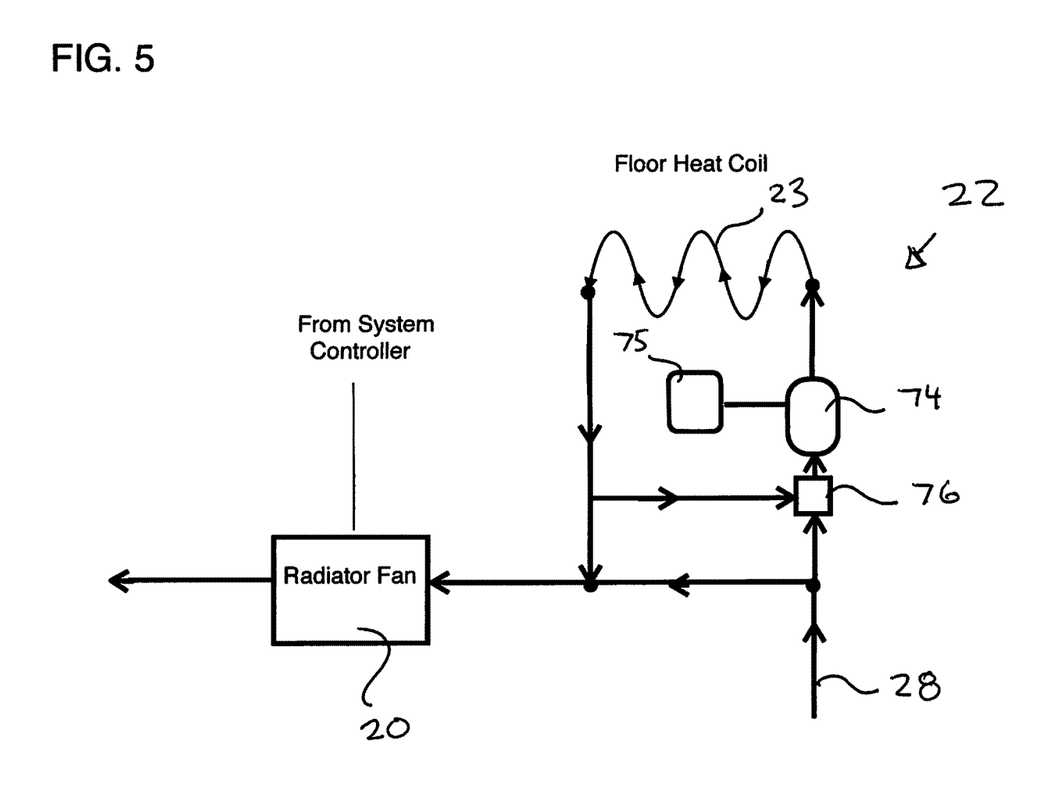
FIG. 5 is a block diagrammatic representation of the optional floor heat unit and enclosure radiator fan heat unit.

The Floor Heat Unit 22 and Radiator Fan Heat Unit 20 can be seen in FIG. 5. Although these two heat dispensing units are depicted in series, not all but the larger more luxurious recreational vehicles have both systems. Generally, the floor heat unit is an option for floors with significant thermal masses like tile, stone or slate. It has a dedicated thermostatic controller 75 located on the wall of the heated space. The glycol input line 28 provides heated glycol through a loop or coil of tubing 22 that resides below the floor of the vehicles enclosed area Similar to the domestic water unit, the amount of hot glycol that is pumped via the floor heat pump 74 to flow through or circulate again through the tubing coil 23 and heat the room, is regulated by a thermostatic mixing valve 76 operated by the thermostatic controller 75. The floor heat pump 74 runs constantly when heat is demanded by the dedicated thermostatic controller 75.

The radiator fan heat unit is a radiator with a thermostatically controlled fan 20. The temperature sensor for this control is found in the tactile display unit 6 (FIG. 6) which is mounted on the wall in the vehicle enclosure. The tactile display unit 6 relays temperature data signals, the desired set temperature and a selected fan speed to the system controller 4. As the temperature in the room cycles in a preset range around the selected temperature it adjusts the power through the fan speed circuit to modulate the fan on and off and adjust the fan speed.

The System Controller 2 and the Remote Tactile Display Unit 6 as seen in FIG. 6, control the operation of the fluid heating system 2. Each are integrated circuit microprocessors with the associated necessary CPU's, imbedded time clocks, memory, registers and digital circuits. The system controller 4 resides on a PCB with a microprocessor/CPU 99 and the numerous individual digital circuits, that provide power, data or signals to electrical devices in the system components. Notably, these individual circuits include a fan speed controller 112, a circulation pump after-run timer circuit 138, a circulation pump power circuit 110, an electric heat start circuit 116, a battery switchover timer circuit 136, a maintenance data interface circuit 121, a wireless communication circuit with wireless transceiver 120, an altimeter circuit 132 with air pressure sensor 131, a furnace restart circuit 134, a furnace power circuit 150.

The DC power for the system is input to the system controller 4 from either a dedicated system battery bank 80 or from the vehicle's battery bank 82. The power draw from the vehicle's battery bank 82 is used only in rare conditions and for timed out periods, as depleting it below the threshold to start the vehicle must be prevented. The DC power to operate the tactile display unit 6 as well as that provided to the furnace controller to run the furnace fan, pump and burner is routed through the system controller 4.

The tactile display unit 6 is operably connected to the system controller 4 by a wire harness 86 that contains both a power feed 88 and data signal lines 90. The tactile display unit 6 is intended for mounting in the RV's cabin while the system controller will be discretely mounted outside the cabin. The tactile display unit 6 has a local temperature sensor 92 that monitors the cabin air temperature. This data is provided to the system controller 4 to modulate the radiator fan starting and speed through the fan speed circuit 112. The tactile display unit 6 has a power button 100, a thermostat display 94, a fan speed button 96, a room temperature button 98, a constant hot water button 102 and three heat source selection buttons for engine 104, electric 106 or furnace 108. The tactile display unit does not directly operate any of the components of the loop 2. (FIG. 1) Rather, all actions taken at, or by the tactile display unit 6 are sent as signals through the wire harness 86 to the system controller 4 which affects operations of the loop components through the various circuits in the system controller 4.

When any heat source is selected at the tactile display unit 6, the system controller 4 actuates the circulation pump circuit 110 that provides power to the system circulation pump 10 (FIG. 1) to begin the glycol flowing through the system loop 2. When constant hot water is selected at the tactile display unit 6 the system controller 4 actuates an internal switch that provides power to the domestic water pump 66 which is then modulated on and off by its own thermostatic switch 70.

The temperature sensor 92 in the tactile display unit 6 continually sends room temperature data to the system controller 4 from the local temperature sensor 92 as well as the set temperature and set fan speed. This data is provided to the system controller 4 that starts and controls the radiator fan through the fan speed circuit 112 and keeps the room temperature within a set range about the temperature set on the tactile display unit 6. When the fan speed is adjusted at the tactile display unit 6, the fan speed circuit 112 in the system controller 4, adjusts the power going to the radiator fan 20.

When one of the available three heat sources is selected at the tactile display unit 6 the system controller 4 not only starts the system circulation pump 10, it also arms or readies that heat source's associated controller for operation.

When the electric heat source is selected the system controller 4 electric heater circuit 116 provides DC power to actuate the heater start switch 32 that allows AC power to reach the heater element 38. The temperature of the outlet glycol from the electric heater is controlled thereafter as set forth above with the two thermostatic switches 36 and 40.

When the engine heat source is selected there is no need for the system controller to affect operation of anything except the system circulation pump 10 via the circulation pump circuit 110.

When the furnace heat source is selected, the system controller 4 actuates the circulation pump circuit 110 to start the circulation pump 10, provides an analog start signal to the furnace controller 52 to ready its system for operation, and through the furnace start circuit 150 provides DC power to the furnace controller 52. The furnace controller 52 adjusts the speed of the fuel pump 54 and variable speed combustion fan 56 and powers the burner 50 (glow plug).

The system controller 4 also has an air pressure sensor (altimeter) 132 that provides a data signal along the CANBUS to the furnace controller 52. The furnace controller provides an algorithmic calculation to adjust the speed of the variable speed fuel pump 54 (slow it down) and the speed of the variable speed combustion fan 56 (speed it up) for optimized performance where there is reduced atmospheric pressure, as would be encountered driving at an elevation over 5000 ft. The system controller 4 also has a furnace restart circuit 134 that sends a reset signal to the furnace controller 52 (and then the fuel pump). This allows the furnace controller 52 to continue to make attempts to start the furnace again, until the furnace cut off switch 48 reaches its attempt limit and again cuts off furnace operation. This furnace restart circuit 134 initiates a restart signal to be sent to the furnace controller 52 via a prompt from the user's smart phone, sent through the wireless communication transceiver 120 of the system controller 4 to the microprocessor 126. This is initiated remotely by the user once they have received an alert message of a furnace failure provided to the system controller 4 from the furnace controller 52 via the CANBUS 58 and relayed to the user's smart phone by the microprocessor 126 via the wireless communication transceiver 120.

There is a shutdown timer switch 136 in the system controller 4 to prevent damage in event the system battery bank power is lost or switched off while the furnace is running. If power is lost, the furnace, won't be able to go through its cool down/shut off cycle and may be damaged. The system controller 4 senses when the furnace is on and when the system battery bank 80 is shut off, and it actuates the shutdown timer switch 136 that switches power over to the engine battery bank 82 for a short, timed period, generally 90 seconds. This will provide power to the furnace controller 52 to allow the furnace to go through its cool down/shut off cycle so the combustion fan 56 can run to clear out the hot gasses. At the same time, the system controller 4 will actuate a circulation pump after-run timer circuit 138 that will provide power to the circulation pump 10 to keep the glycol 8 flowing thru the furnace burner 50 to cool down the furnace system components. Then, after a min or two the shutdown relay switch 136 switches the power back to the system battery bank, (which is switched off or dead) otherwise, the coolant pump would continue to run (even though the furnace was shut down) and draw down the engine battery bank 82.

The system controller 4 also has a wireless communication circuit 123 that sends and receives wireless signals from the system controller's microprocessor 126 via a wireless transceiver 120 in whatever protocol the unit operates on (preferably WiFi, or Bluetooth® but including radio frequency (RF), satellite, microwave, Institute of Electrical and Electronics Engineers (IEEE) 545.11, optical, infrared, cable, laser, etc.). This allows the transfer of furnace system status data signals and fault codes that are sent to the system controller 4 from the furnace controller 52 to the maintenance data interface circuit 121 using the CANBUS. In this way, the furnace system status can be displayed on a local user's smart phone 124 via an installed application, and the user can send operational signals to the system controller 4 via their cell phone 124.

The novelty of this fluid heating system is the design and functions available through its system controller 4 as input by its tactile display unit 6. The system controller 4 is in electrical and electronic communication with two of the three heat source components, the furnace (through the furnace controller), and the electric heater. The room radiator fan and coolant pump are also controlled by this unit. It also controls the timed battery bank switchover, and the furnace restart circuit. The system controller 4 also has an altimeter that provides signals to the furnace controller to regulate the fuel pump and the fan speed of the furnace. The system controller 4 is in wireless communication (via an integrated wireless communication unit) with the user's cell phone to provide a continual real time update of the operation of the furnace with any activated fault codes as well as providing a remote furnace restart. The vehicle engine heat source is controlled by the engine thermostat. The domestic water heat is controlled by a manually set mixing valve 65.

In operational summation, the fluid heating system is a hydronic heating system that may be operated in a constant heat or an economy mode. It heats the heat transfer fluid through one of three heat sources and circulates it in a closed loop until there is a demand to heat the air in a room (via a radiator fan) from a local tactile control unit with a temperature sensor, or a demand for constant hot water from the same tactile control unit. If there is the optional floor coil to heat the room, it has its own local thermostatic controller that starts and stops its circulating pump and operates the thermostatic mixing valve. By default, the primary source of heat is via the electric heater (1500 watts) when electric power is available. The secondary source is the gas furnace, (5000 watts), however the furnace will not start when the electric heater is on unless the heater cannot keep up with the demand for heat, at which point the gas furnace will start to supplement the heat output by the electric heater. (The engine heat source is only available when the engine of the RV is running.) In the economy mode, the circulating pump and the heat source only come on upon a demand for heat. In the constant heat mode, the circulating pump and heat source/s operate constantly keeping the heat transfer fluid warm and ready for instantly dispensing heat to the radiator fan, floor coil or domestic water system. This is handy in cold weather or when there is a great demand for hot water.

While certain features and aspects have been described with respect to exemplary embodiments, one skilled in the art will recognize that numerous modifications are possible. System components described according to a particular structural architecture and/or with respect to one system may be organized in alternative structural architectures and/or incorporated within other described systems. Hence, while various embodiments are described with—or without— certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, it will be appreciated that the invention is intended to cover all modifications and equivalents within the scope of the following claims.

Embodiments are described herein, and illustrated in the drawings, in terms of functional blocks, units and/or modules. Those skilled in the art will appreciate that these blocks, units and/or modules can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software.

Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Having thus described the invention, what is claimed as new and desired to be secured by Letters Patent is as follows:

1. A fluid heating system for recreational vehicles, boats or off-grid housing, comprising:
a closed piping loop with at least two heat input sources and at least one heat dispensing unit, all connected in-line with said piping loop;
a heat transfer fluid inside said piping loop;
an expansion tank connected to said piping loop;
a system circulating pump in-line with said loop for circulating said heat transfer fluid from said expansion tank around said piping loop;
a first heat input source comprising an electric heater located inside said expansion tank, said electric heater connectable to an AC power source;
a second heat input source comprising a gas furnace which is connectable to a gas source, said gas furnace connected in-line with said piping loop;
a furnace controller operatively connected to said gas furnace;
a first heat dispensing unit comprising a radiator fan connected in-line with said piping loop;
a microprocessor system controller operatively connected to said at least two heat input sources and to said at least one heat dispensing unit, wherein said microprocessor system controller has a wireless communication transceiver in communication with a user's smart phone, a wireless communication circuit, a maintenance data interface connected to said furnace controller by a CANBUS circuit, a furnace restart circuit connected to said furnace controller by a CANBUS circuit, and an air pressure circuit operatively connected to said system controller for adjustment of said gas furnace;
a tactile control unit operationally connected to said microprocessor system controller for the input of fluid heating system operational parameters to said microprocessor system controller;
a local temperature sensor connected to said tactile control unit;
at least one DC power source connected to at least said system controller, said tactile control unit, said system circulating pump, said radiator fan, said gas furnace, said air pressure circuit, and said furnace controller;
wherein said microprocessor system controller operates said circulating pump to circulate said heat transfer fluid around said piping loop and through said at least two heat sources and through said at least one heat dispensing unit; and
wherein said microprocessor system controller provides operating signals to said at least two heat sources and said at least one heat dispensing unit; and
wherein said user's smart phone is wirelessly connectable to said furnace restart circuit by said wireless communication transceiver and wireless communication circuit, for the purpose of restarting said gas furnace after a furnace shutdown has occurred.

2. The fluid heating system of claim 1 further comprising;
a circulation pump power circuit;
a circulation pump after run timer circuit operably connected to said circulation pump power circuit; and
a system battery bank in said at least one DC power source; and
an engine battery bank in said at least one DC power source;
wherein upon a manual shutdown of said system battery bank of the fluid heating system, said after run timer circuit will provide temporary DC power to said fluid heating system from said engine battery bank, to continue operation of said circulation pump for furnace cool down.

3. The fluid heating system of claim 1 wherein said furnace further comprises:
a variable speed fuel pump;
a variable speed combustion air fan; and
a burner;
a temperature sensor and a high temperature sensor located in said closed piping loop, providing temperature data to said furnace controller used to adjust an amount of fuel and air sent to said burner.

4. The fluid heating system of claim 2 further comprising:
an air pressure sensor connected to said air pressure circuit;
wherein said air pressure circuit is connected to said gas furnace controller to provide a signal to adjust the speed of a fuel pump and of a combustion fan in said gas furnace based on altitude.

5. The fluid heating system of claim 3 further comprising:
an air pressure sensor connected to said air pressure circuit;
wherein said air pressure circuit is connected to said gas furnace controller to provide a signal to adjust the speed of a fuel pump and of a combustion fan in said gas furnace based on altitude.

6. The fluid heating system of claim 2 further comprising:
a third heat input source comprising an engine heat exchanger said engine heat exchanger having a first side and a second side connected in-line with said piping loop, wherein through said first side is circulated a coolant from an engine of a vehicle said fluid heating system is incorporated therein, and through said second side is circulated said heat transfer fluid.

7. The fluid heating system of claim 1 further comprising;
a second heat dispensing unit comprising a domestic water unit connected in-line with said piping loop, said domestic water unit having a piping system with a domestic water circulating pump modulated on and off from a water pressure sensor in said piping system and a manual mixing valve.

8. The fluid heating system of claim 3 wherein said furnace controller is in two way communication with said user's smart phone to provide data about the operating status of said gas furnace and to reset and attempt to start said gas furnace in the event of a furnace shutdown.

9. The fluid communication system of claim 2 wherein said tactile control unit is connectable to said user's smart phone for the two way transfer of data and operational signals.

* * * * *